June 12, 1945.    A. B. FULLER    2,378,207
CAMERA SHUTTER
Filed Jan. 21, 1943
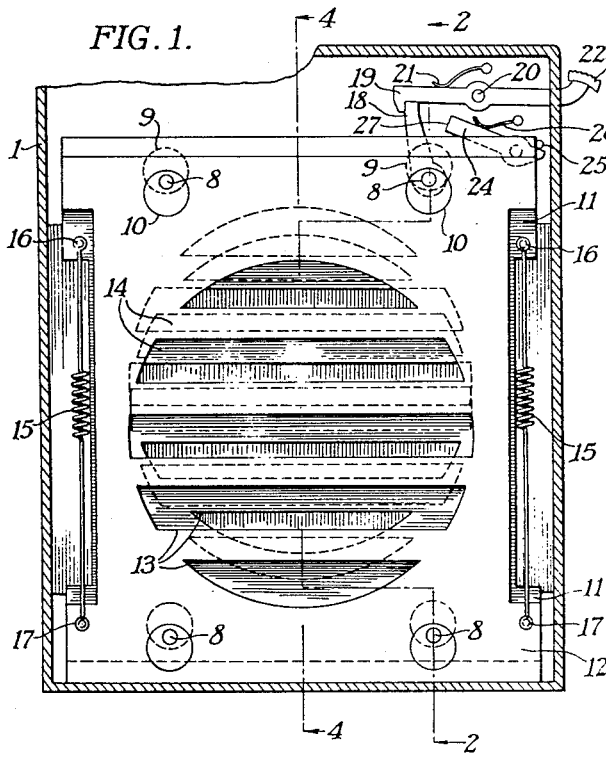
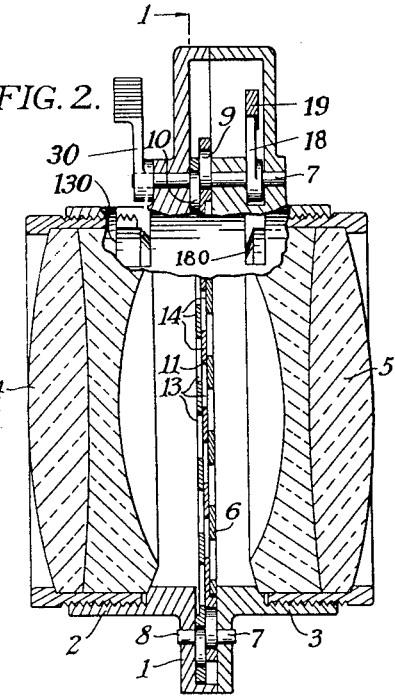
ALBERT B. FULLER, DEC'D
BY AMBIA W. KELSO, EXECUTRIX
INVENTOR
BY
ATTORNEYS Patented June 12, 1945

2,378,207

UNITED STATES PATENT OFFICE 2,378,207

CAMERA SHUTTER

Albert B. Fuller, deceased, late of Rochester, N. Y., by Ambia W. Kelso, executrix, Rochester, N. Y., assignor to Eastman Kodak Company, Rochester, N. Y., a corporation of New Jersey Application January 21, 1943, Serial No. 473,099

14 Claims. (Cl. 95—56)

This invention relates to photography and more particularly to a photographic shutter. One object of the invention is to provide an extremely simple high speed shutter particularly adapted for use for aerial cameras. Another object of the invention is to provide a shutter of the setting type in which only an extremely small movement is required of the setting lever to set the shutter. Another object of the invention is to provide a shutter which is extremely quiet in operation. Another object of my invention is to provide a shutter of the between-the-lens type in which the construction is so compact that it may be placed in an extremely small space and other objects will appear from the following specification, the novel features being particularly pointed out in the claims at the end thereof.

In aerial camera shutters it has been customary to use focal plane shutters because it has been extremely difficult to obtain the necessary speed of known types of between-the-lens shutters which have many advantages over the focal plane shutters except the difficulty of securing a sufficiently high speed. It has been found that a grid type of shutter can be produced which will give the required speed for long focal length lenses of comparatively wide aperture and that, while such a shutter is less efficient in that the exposure aperture is never completely uncovered, nevertheless sufficient exposure can be obtained with the new fast films and relatively wide aperture lenses to produce a fully exposed negative in the exposure which can be made with this type of shutter. With the present fast moving aeroplanes it is desirable to obtain between $\frac{1}{600}$ and $\frac{1}{800}$ of a second for certain types of work. This can be accomplished with the shutter hereinafter more fully described.

Coming now to the drawing wherein like reference characters denote like parts throughout:

Fig. 1 is a section taken on line 1—1 of Fig. 2 showing partly in elevation a shutter constructed in accordance with and embodying a preferred form of this invention;

Fig. 2 is a section taken on line 2—2 of Fig. 1 with parts shown in elevation showing a typical between-the-lens type of grid shutter with the shutter members in a closed position;

Fig. 3 is an expanded perspective view showing the more important parts of this shutter spaced apart so that this schematic view illustrates the principles of operation of the grid type plates; and Fig. 4 is a sectional view through the grid plates when in an open position.

In accordance with this invention the shutter may consist of a casing or support 1 from which a front annular flange 2 and a rear annular flange 3 extends to support the front component 4 and the rear component 5 of an objective. The support may consist primarily of a carrier for a fixed grid plate 6 which rotatably supports a plurality of shafts 7, here shown at 4 in number. The opposite ends 8 of the shafts are rotatably mounted in the front support member 1.

Each of the shafts 7 carries cams 9 and 10. Cams 9 support a movable grid plate 11 and cams 10 support a second movable grid plate 12. These cams, it will be noticed from Fig. 3, are so positioned that when the shafts 7 rotate in the direction shown by the arrow A, the cams 9 will start the grid plate 11 moving down while at the same time the cams 10 will start the grid plate 12 moving up so that the grid plates move in an opposite direction as the shafts 7 are moved.

Each grid plate consists of a plurality of slots 13 between bars 14 so that the exposure is made during the time the various slots 13 and the various bars 14 are in registry or partial registry, Fig. 4 showing the fully-opened position. Since the grid plates are located between the lens elements or components 4 and 5, no image of the bars 14 will appear on the negative.

The prime mover for causing the rapid movement of the movable grid plates consists of one or more spring members 15 connected at one end 16 to the grid plate 11 and connected at the other end 17 to the grid plate 12. Thus, the springs 15 always tend to draw the ends of the plates toward each other.

Fig. 3 schematically illustrates the shutter plates in a position to make an exposure in which the grid plates will be in the position shown in Fig. 2. This view illustrates one of the shafts 7 as carrying a latch member 18 which is held by a movable latch member 19 carried by the support 1 on a shaft 20. Spring 21 holds the latch members together. When it is desired to make an exposure a trigger member 22 may be pressed in the direction of the arrow B. This raises the latch 19 and releases the latch arm 18 so that it may swing through the path 23 passing through the slot 180 in the annular flange 2 and at the end of this swinging movement the latch member 18 carried by the shaft 7 will snap behind a second latch member 24 spring pressed against a pin 25 by a spring 26. While the springs 15 exert a sudden pull upon the two plates 11 and 12 and consequently upon the cams

9 and 10, which are preferably eccentrics, the inertia of the moving parts is such that the arm 18 may be carried nearly up to a dead center position of the cams 9 and 10 and springs 15 and up to the position shown by the end of the lever 27.

In order to set the shutter for an exposure the arm 30 must be moved in the direction shown by the arrow D, which movement will move the latch member 18 of a shaft 7 through the angle E, Fig. 3, and past the dead center position which is reached when the latch member reaches the position indicated by the line F. Thus, when the setting lever 30 is moved through the small angle E necessary to set the shutter, it merely moves the shaft 7 until the latch element 18 crosses the dead center position F and is in a position from which it will immediately be operated by the springs 15 when the trigger 22 is depressed. During an exposure and setting, lever 30 makes one revolution passing through the slot 130 in the annular flange 2.

From the above description it will be noticed that this shutter is an extremely simple one and it is one which is extremely inexpensive when it is considered what can be accomplished by the grid plate type of shutter.

It is, of course, not an efficient shutter because the exposure opening is never fully opened, but it has nevertheless been found that this shutter has many advantages over the more efficient shutters in that it is simple in construction and capable of extremely high and accurate speed. In its simplest form only one speed can be obtained, but this is not a disadvantage for shutters designed primarily for aviation purposes and it is a comparatively simple matter to provide a number of shutters having different fixed speeds, such as 1/500 of a second, 1/700 of a second, and 1/000 of a second exposure, so that the proper shutter can be selected for the prevailing light conditions.

What is claimed is:

1. A shutter for photographic cameras comprising a support, three similar grid plates mounted in parallel relationship on the support and positioned with the grids overlapping and excluding light, means for moving at least two of the three grid plates to momentarily register the grid openings of the three grid plates to make an exposure, said means including shafts extending transversely of the grid plates, eccentric cams carried by said shafts for engaging and oscillating two of the three grid plates through a circular path substantially equal in extent to the spacing of the grids of the grid plates, the eccentric cams being positioned to move the grids of the grid plates in the same direction but at 180° apart.

2. A shutter for photographic cameras comprising a support, three similar grid plates mounted in parallel relationship on the support with the grid plates in a normal light excluding position, means for moving at least two of the three grid plates to register the grid openings of the three grid plates to make an exposure, said means including at least two shafts, eccentric cams carried by said shafts for engaging and oscillating two of the three grid plates through a circular path substantially equal in extent to the spacing of the grids of the grid plates, the eccentric cams being positioned to move the grids of the movable grid plates in the same direction and at 180° apart and a spring connecting the oppositely moving grid plates for furnishing power to move said grid plates.

3. A shutter for photographic cameras including a support, parallel shafts carried by the support, three grid plates carried by the shafts and normally positioned so that the three grid plates exclude light, cams carried by the shafts for moving at least two of the three grid plates, the shape of the cams being such that the openings in the grid plates may register whereby light may pass between the grid plates to make an exposure.

4. A shutter for photographic cameras including a support, parallel shafts carried by the support, three grid plates carried by the shafts, and cams carried by the shafts, one grid plate fixedly carried by the shafts, the other two grid plates carried by cams on the shafts to be moved thereby to register the grids of the grid plates for an exposure.

5. A shutter for photographic cameras including a support, parallel shafts carried by the support, three grid plates carried by the shafts, and cams carried by the shafts, one grid plate fixedly carried by the shafts, the other two grid plates carried by cams on the shafts to be moved thereby to register the grids of the grid plates for an exposure, the cams carried by the shafts being positioned to support the two grid plates in a position to be moved in opposite directions to make an exposure.

6. A shutter for photographic cameras including a support, parallel shafts carried by the support, three grid plates carried by the shafts, and cams carried by the shafts, one grid plate fixedly carried by the shafts, the other two grid plates carried by cams on the shafts to be moved thereby to register the grids of the grid plates for an exposure, the cams carried by the shafts being positioned to support the two grid plates in a position to be moved in opposite directions to make an exposure, and spring means connecting the grid plates mounted on the cams.

7. A shutter for photographic cameras including a support, parallel shafts carried by the support, three grid plates carried by the shafts, and cams carried by the shafts, one grid plate fixedly carried by the shafts, the other two grid plates carried by cams on the shafts to be moved thereby to register the grids of the grid plates for an exposure, the cams carried by the shafts being positioned to support the two grid plates in a position to be moved in opposite directions to make an exposure, and spring means connecting the grid plates mounted on the cams normally positioned approximately on a dead center with respect to said cams, and movable from this position for making an exposure.

8. In a shutter including an exposure opening, a plurality of grid plates covering said opening and relatively movable to permit light to pass through the opening to make an exposure, the combination with said grid plates, of a power means for moving the movable plates comprising parallel shafts, eccentrics on said shafts drivably engaging two of said grid plates, the eccentrics for driving one grid plate being located at 180° of the eccentric driving the other grid plate and a power spring connecting the two grid plates.

9. In a shutter including an exposure opening, a plurality of grid plates covering said opening and relatively movable to permit light to pass through the opening to make an exposure, the combination with said grid plates, of a power means for moving the movable plates comprising parallel shafts, eccentrics on said shafts drivably engaging two of said grid plates, the eccentrics for driving one grid plate being located at 180° of the eccentric driving the other grid plate, a power spring connecting the two grid plates, and a latch mechanism including one element carried by the shaft and another element carried by the support.

10. In a shutter including an exposure opening, a plurality of grid plates covering said opening and relatively movable to permit light to pass through the opening to make an exposure, the combination with said grid plates, of a power means for moving the movable plates comprising parallel shafts, eccentrics on said shafts drivably engaging two of said grid plates, the eccentrics for driving one grid plate being located at 180° to the eccentric driving the other grid plate, a power spring connecting the two grid plates, and a latch mechanism including one element carried by the shaft and two other elements carried by the support, one for releasing the shaft latch and the other for catching the shaft latch after an exposure.

11. In a shutter including an exposure opening, a plurality of grid plates covering said opening and relatively movable to permit light to pass through the opening to make an exposure, the combination with said grid plates, of a power means for moving the movable plates comprising parallel shafts, eccentrics on said shafts drivably engaging two of said grid plates, the eccentrics for driving one grid plate being located at 180° to the eccentric driving the other grid plate, a power spring connecting the two grid plates, and a latch mechanism including one element carried by the shaft and two other elements carried by the support, one for releasing the shaft latch and the other for catching the shaft latch after an exposure, said latch elements being positioned approximately on both sides of a dead center position of the eccentrics and power spring.

12. In a shutter including an exposure opening, a plurality of grid plates covering said opening and relatively movable to permit light to pass through the opening to make an exposure, the combination with said grid plates, of a power means for moving the movable plates comprising parallel shafts, eccentrics on said shafts drivably engaging two of said grid plates, the eccentrics for driving one grid plate being located at 180° of the eccentric driving the other grid plate, a power spring connecting the two grid plates, and a latch mechanism including one element carried by the shaft and two other elements carried by the support, one for releasing the shaft latch and the other for catching the shaft latch after an exposure, said latch elements being positioned approximately on both sides of a dead center position of the eccentrics and power spring, and means for initiating an exposure comprising a trigger for releasing the shaft latch.

13. In a shutter including an exposure opening, a plurality of grid plates covering said opening and relatively movable to permit light to pass through the opening to make an exposure, the combination with said grid plates, of a power means for moving the movable plates comprising parallel shafts, eccentrics on said shafts drivably engaging two of said grid plates, the eccentrics for driving one grid plate being located at 180° of the eccentric driving the other grid plate, a power spring connecting the two grid plates, and a latch mechanism including one element carried by the shaft and two other elements carried by the support, one for releasing the shaft latch and the other for catching the shaft latch after an exposure, said latch elements being positioned approximately on both sides of a dead center position of the eccentrics and power spring, means for turning the eccentric shaft until the shaft latch moves past a dead center position of the power spring and eccentrics, in which position it may be held by said latch member carried by the support.

14. In a shutter including an exposure opening, a plurality of grid plates covering said opening and relatively movable to permit light to pass through the opening to make an exposure, the combination with said grid plates, of a power means for moving the movable plates comprising parallel shafts, eccentrics on said shafts drivably engaging two of said grid plates, the eccentrics for driving one grid plate being located at 180° of the eccentric driving the other grid plate, a power spring connecting the two grid plates, and a latch mechanism including one element carried by the shaft and two other elements carried by the support, one for releasing the shaft latch and the other for catching the shaft latch after an exposure, said latch elements being positioned approximately on both sides of a dead center position of the eccentrics and power spring, means for turning the eccentric shaft until the shaft latch moves past a dead center position of the power spring and eccentrics, in which position it may be held by said latch member carried by the support, and a trigger for releasing the latch element holding the shaft latch to make an exposure.

AMBIA W. KELSO,
*Executrix of the Estate of Albert B. Fuller, Deceased.*